United States Patent
Lee et al.

(10) Patent No.: US 11,923,145 B2
(45) Date of Patent: Mar. 5, 2024

(54) MULTILAYER CAPACITOR HAVING IMPROVED RELIABILITY BY ADJUSTING GRAIN SIZE OF DIELECTRIC LAYER

(71) Applicant: SAMSUNG ELECTRO-MECHANICS CO., LTD., Suwon-si (KR)

(72) Inventors: Je Hee Lee, Suwon-si (KR); Seung In Baik, Suwon-si (KR); Ji Su Hong, Suwon-si (KR); Eun Ha Jang, Suwon-si (KR); Hyoung Uk Kim, Suwon-si (KR); Jae Sung Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 163 days.

(21) Appl. No.: 17/465,176

(22) Filed: Sep. 2, 2021

(65) Prior Publication Data
US 2022/0139625 A1  May 5, 2022

(30) Foreign Application Priority Data

Nov. 2, 2020 (KR) .......................... 10-2020-0144401

(51) Int. Cl.
*H01G 4/12* (2006.01)
*H01G 4/012* (2006.01)
*H01G 4/30* (2006.01)

(52) U.S. Cl.
CPC ........... *H01G 4/1227* (2013.01); *H01G 4/012* (2013.01); *H01G 4/30* (2013.01)

(58) Field of Classification Search
CPC ........ H01G 4/1227; H01G 4/012; H01G 4/30; H01G 4/12; H01G 4/224; H01G 4/232; C04B 35/4682
See application file for complete search history.

(56) References Cited

U.S. PATENT DOCUMENTS

2014/0301013 A1  10/2014  Kim
2015/0340155 A1  11/2015  Fukunaga et al.
(Continued)

FOREIGN PATENT DOCUMENTS

JP    H11317321 A   * 11/1999
JP    2015141982 A  *  8/2015
(Continued)

OTHER PUBLICATIONS

Gong, Huiling et al., "Grain size effect on electrical and reliability characteristics of modified fine-grained BaTiO3 ceramics for MLCCs", Journal of the European Ceramic Society 34 (2014), pp. 1733-1739.
(Continued)

*Primary Examiner* — David M Sinclair
*Assistant Examiner* — Daniel M Dubuisson
(74) *Attorney, Agent, or Firm* — MORGAN, LEWIS & BOCKIUS LLP

(57) ABSTRACT

A multilayer capacitor includes a body including a multilayer structure in which a plurality of dielectric layers are stacked in a first direction and a plurality of internal electrodes stacked with the dielectric layer interposed therebetween and external electrodes formed outside the body and connected to the internal electrodes. The body includes an active portion and a side margin portion covering the active portion and opposing each other in a second direction, and $1<A2/M1\leq1.5$ and $A2<A1$ in which $A1$ is an average grain size of the dielectric layers in a central region of the active portion, $A2$ is an average grain size of the dielectric layers at an active boundary part of the active portion adjacent to the side margin portion, and $M1$ is an average grain size of the dielectric layers in a central region of the side margin portion.

20 Claims, 7 Drawing Sheets
(2 of 7 Drawing Sheet(s) Filed in Color)

(56) References Cited

U.S. PATENT DOCUMENTS

| | | | | |
|---|---|---|---|---|
| 2019/0355519 A1* | 11/2019 | Taniguchi | .............. | H01G 4/232 |
| 2020/0185152 A1* | 6/2020 | Uchida | .................. | H01G 4/012 |
| 2020/0312569 A1* | 10/2020 | Uchida | .................... | H01G 4/30 |
| 2020/0373087 A1* | 11/2020 | Kato | ...................... | H01G 4/008 |
| 2020/0402718 A1* | 12/2020 | Oosawa | ............... | H01G 4/2325 |
| 2021/0005382 A1* | 1/2021 | Park | ....................... | H01G 4/012 |
| 2021/0012968 A1* | 1/2021 | Taniguchi | ................ | H01G 4/30 |
| 2022/0013296 A1* | 1/2022 | Nishisaka | ............ | H01G 4/0085 |

FOREIGN PATENT DOCUMENTS

| | | | |
|---|---|---|---|
| JP | 2016-001721 A | | 1/2016 |
| KR | 10-1681358 B1 | | 11/2016 |
| KR | 20190116113 A | * | 10/2019 |

OTHER PUBLICATIONS

Zhao, Qiancheng et al., "Superior Reliability Via Two-Step Sintering: Barium Titanate Ceramics", Journal of the American Ceramic Society, vol. 99, (2016), pp. 191-197.

* cited by examiner

MULTILAYER CAPACITOR HAVING IMPROVED RELIABILITY BY ADJUSTING GRAIN SIZE OF DIELECTRIC LAYER

CROSS-REFERENCE TO RELATED APPLICATION

This application claims benefit of priority to Korean Patent Application No. 10-2020-0144401 filed on Nov. 2, 2020 in the Korean Intellectual Property Office, the disclosure of which is incorporated herein by reference in its entirety.

TECHNICAL FIELD

The present disclosure relates to a multilayer capacitor.

BACKGROUND

A capacitor is a device capable of storing electricity in which electricity is generally accumulated in each of two facing electrodes when a voltage is applied thereto. When a direct current (DC) voltage is applied, current flows in the capacitor, while electricity is accumulated therein, and when accumulating is completed, no current flows. Meanwhile, when an alternating current (AC) voltage is applied, AC current flows, while polarities of electrodes alternate.

Capacitors may be classified into various types such as an aluminum electrolytic capacitor in which electrodes are formed of aluminum and a thin oxide film is provided between the aluminum electrodes, a tantalum capacitor using tantalum as a material of electrodes, a ceramic capacitor using a high-k dielectric material such as titanium, barium, or the like, between electrodes, a multilayer ceramic capacitor (MLCC) using a multilayer structure of high-k ceramics as a dielectric material provided between electrodes, a film capacitor using a polystyrene film as a dielectric material between electrodes, and the like.

Among the capacitors, the MLCC advantageously has excellent temperature characteristics and frequency characteristics, may be implemented in a small size, and thus has been widely applied in various fields such as high-frequency circuits. In recent years, attempts to implement a smaller multilayer ceramic capacitor have continued, and to this end, a dielectric layer and an internal electrode are formed to be thin. However, as components become smaller, it is difficult to improve electrical and structural reliability.

SUMMARY

An aspect of the present disclosure may provide a multilayer capacitor having improved reliability such as a withstand voltage characteristic by adjusting a grain size of a dielectric layer in each region.

According to an aspect of the present disclosure, a multilayer capacitor may include a body including a plurality of dielectric layers and a plurality of internal electrodes stacked with the dielectric layer interposed therebetween in a first direction; and external electrodes formed outside the body and connected to the internal electrodes. The body includes an active portion in which the plurality of internal electrodes are located to form capacitance and a side margin portion covering a first surface and a second surface of the active portion opposing each other in a second direction, and $1 < A2/M1 \leq 1.5$ and $A2 < A1$ in which A1 is an average grain size of dielectric layers, among the plurality of dielectric layers, in a central region of the active portion, A2 is an average grain size of the dielectric layers at an active boundary part of the active portion adjacent to the side margin portion, and M1 is an average grain size of the dielectric layers in a central region of the side margin portion.

A2/A1 may be greater than or equal to 0.7.

M2 may be greater than M1 in which M2 is an average grain size of the dielectric layers at the side marginal boundary part of the side margin portion adjacent to the active portion.

M1/M2 may be greater than or equal to 0.7.

T is a length of the body in the first direction and WA is a length of the active portion in the second direction based on a cut surface taken in the first and second directions, A1 may be an average size of grains present in a first rectangle which has a length of WA/3 in the second direction and a length of T/3 in the first direction, and the first rectangle is symmetrical, based on a central line of the active portion in the first direction and a central line of the active portion in the second direction.

A2 may be an average size of grains present in a second rectangle which has a length of WA/4 in the second direction and a length of T/3 in the first direction, and the second rectangle is symmetrical, based on the central line of the active portion in the second direction.

The second rectangle may be in contact with the side margin portion.

When a length of the side margin portion in the second direction is WM, M1 may be an average size of grains present in a third rectangle which has a length of WM/3 in the second direction and a length of T/3 in the first direction, and the third rectangle is symmetrical, based on a central line of the side margin portion in the first direction and a central line of the side margin portion in the second direction.

When an average size of the dielectric layers at a side marginal boundary part of the side margin portion adjacent to the active portion is M2, M2 may be an average size of grains present in a fourth rectangle which has a length of WM/4 in the second direction and a length of T/3 in the first direction, and the fourth rectangle is symmetrical, based on the central line of the side margin portion in the second direction.

The fourth rectangle may be in contact with the active portion.

The dielectric layers may include a barium titanate component, and a molar ratio of Ba to Ti of the dielectric layers in the central region of the active portion may be less than a molar ratio of Ba to Ti of the dielectric layers in the central region of the side margin portion.

A molar ratio of Ba to Ti of the dielectric layers at the active boundary part of the active portion adjacent to the side margin portion may be greater than the molar ratio of Ba to Ti of the dielectric layers at the central region of the active portion and smaller than the molar ratio of Ba to Ti of the dielectric layers at the central region of the side margin portion.

The plurality of internal electrodes may include first and second internal electrodes exposed from the body in a third direction crossing the first and second directions, and the external electrodes may include first and second external electrodes facing each other in the third direction and connected to the first and second internal electrodes, respectively.

The body may further include a cover part covering the active portion in the first direction.

According to an aspect of the present disclosure, a multilayer capacitor may include a body including a plurality of dielectric layers and a plurality of internal electrodes stacked with the dielectric layer interposed therebetween in a first direction; and external electrodes formed outside the body and connected to the internal electrodes. The body includes an active portion in which the plurality of internal electrodes are located to form capacitance and a side margin portion covering a first surface and a second surface of the active portion facing each other in a second direction, and $0.7 \leq A2/A1 < 1$ and $0.7 \leq M1/M2 < 1$, in which A1 is an average grain size of dielectric layers, among the plurality of dielectric layers, in a central region of the active portion, A2 is an average grain size of the dielectric layers at an active boundary part of the active portion adjacent to the side margin portion, M1 is an average grain size of the dielectric layers in a central region of the side margin portion, and M2 is an average grain size of the dielectric layers at the side marginal boundary part of the side margin portion adjacent to the active portion.

$A2/M1 \leq 1.5$ may be satisfied.

BRIEF DESCRIPTION OF DRAWINGS

The patent or application file contains as least one drawing executed in color. Copies of this patent or patent application publication with color drawing(s) will be provided by the Office upon request and payment of the necessary fee.

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
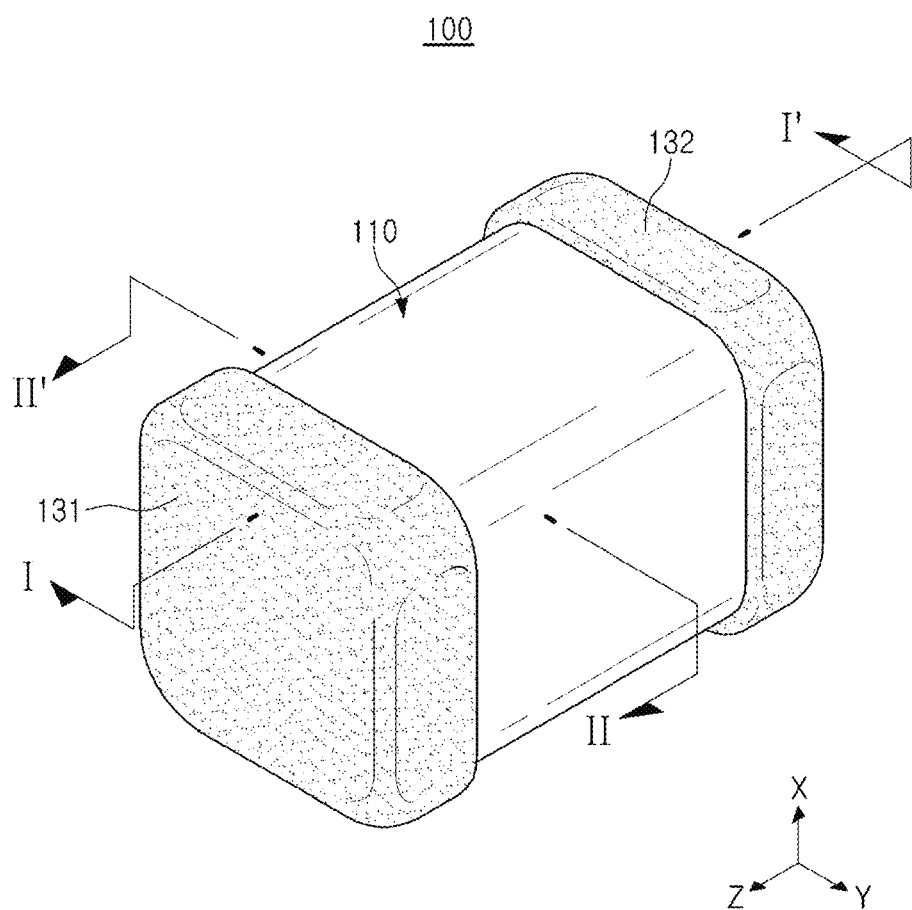
FIG. 1 is a perspective view schematically illustrating an appearance of a multilayer capacitor according to an exemplary embodiment in the present disclosure.
Figure 2:
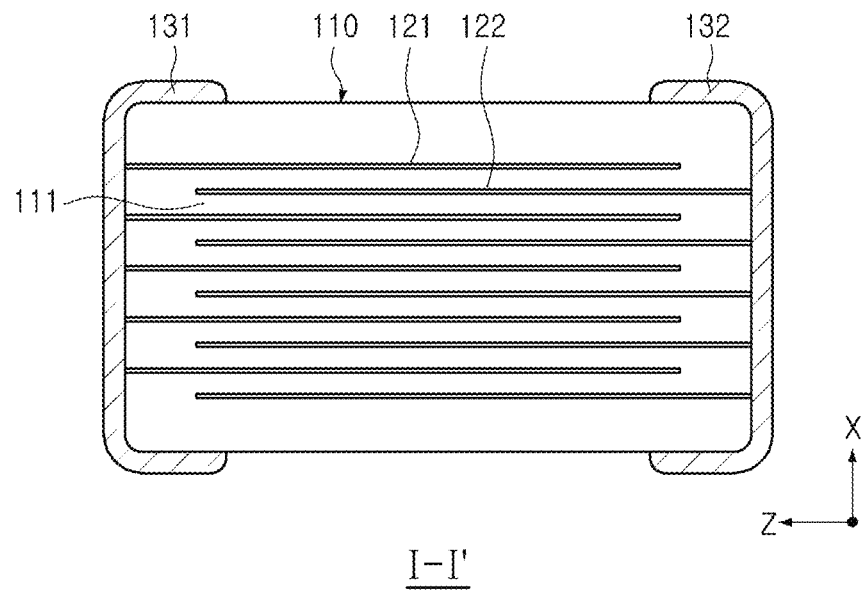
FIG. 2 is a cross-sectional view of the multilayer capacitor of FIG. 1, taken along line I-I'.
Figure 3:
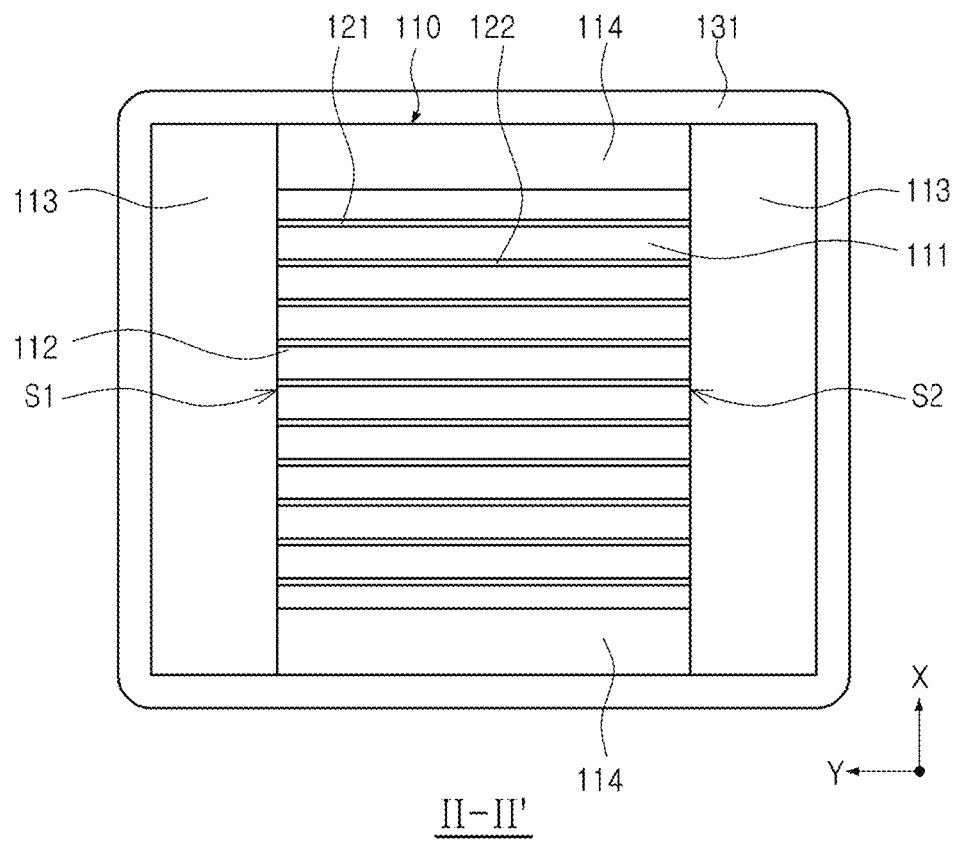
FIG. 3 is a cross-sectional view of the multilayer capacitor of FIG. 1, taken along line II-II'.
Figure 4:
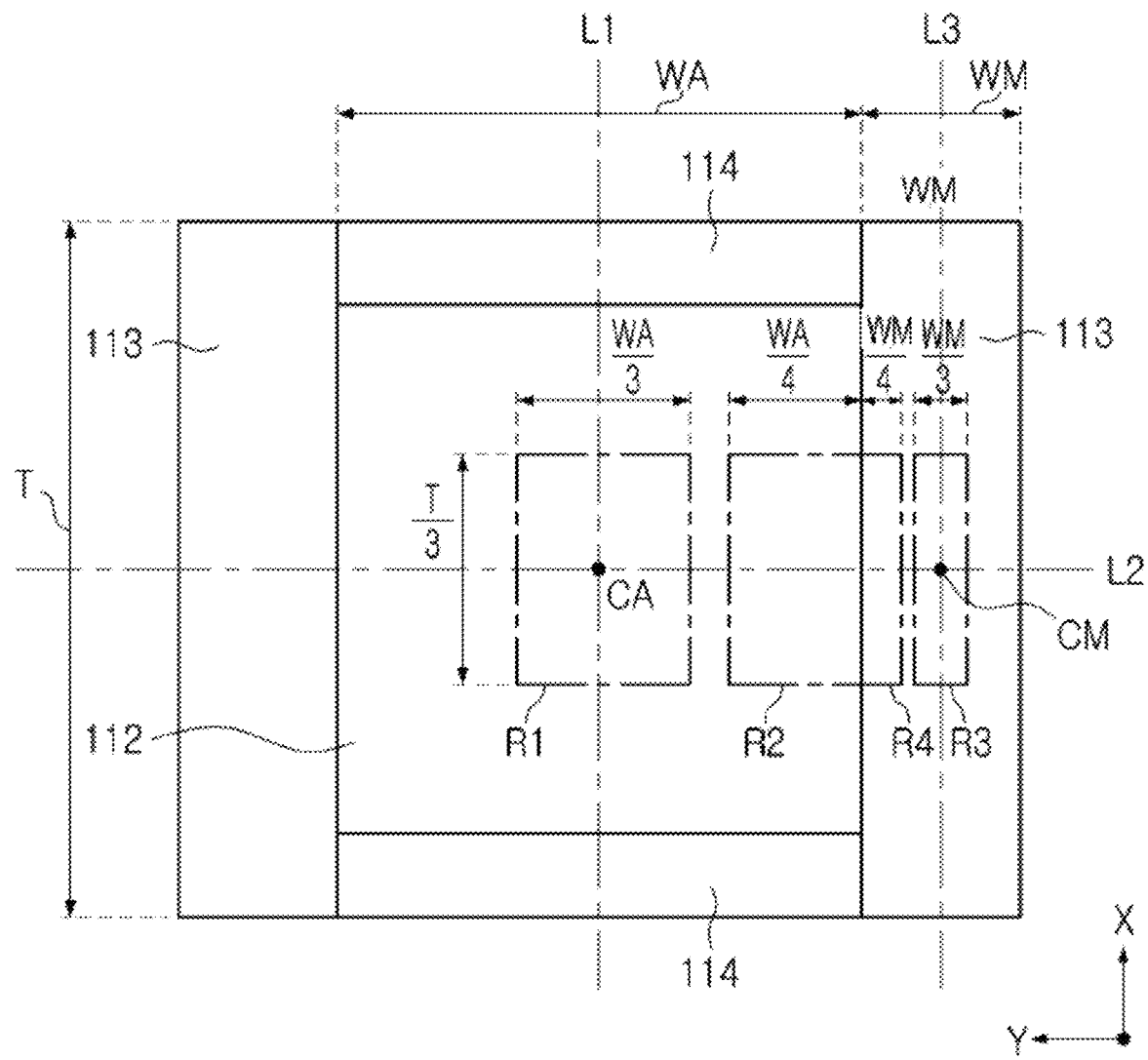
FIG. 4 is a subdivided view of a body region in FIG. 3.
Figure 5:
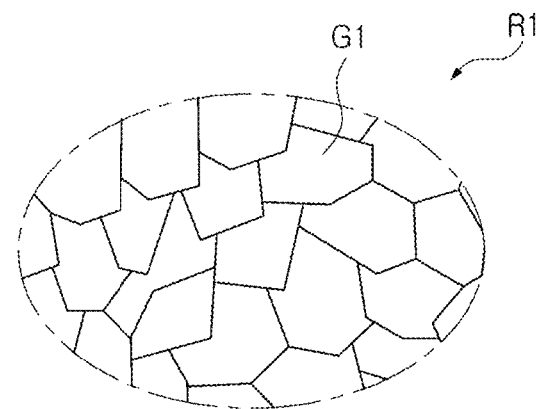
FIGS. 5 through 8 show shapes of dielectric grains of each region of a body.
Figure 6:
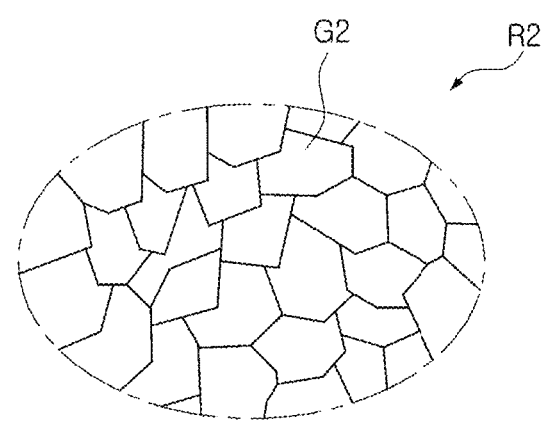
Figure 7:
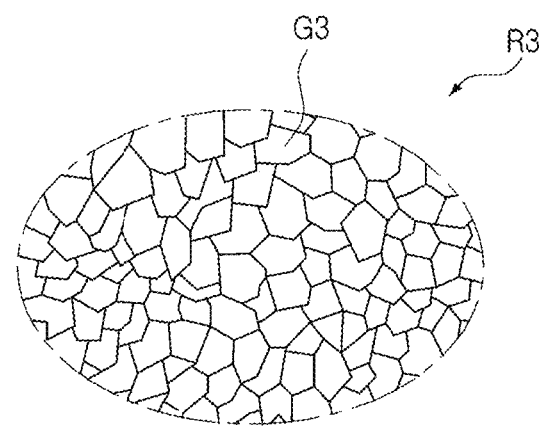
Figure 8:
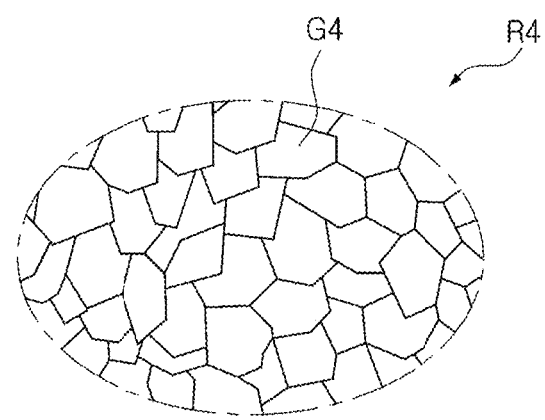

FIG. 1 is a perspective view schematically illustrating an appearance of a multilayer capacitor according to an exemplary embodiment in the present disclosure. FIG. 2 is a cross-sectional view of the multilayer capacitor of FIG. 1, taken along line I-I'. FIG. 3 is a cross-sectional view of the multilayer capacitor of FIG. 1, taken along line II-II', and FIG. 4 is a subdivided view of a body region in FIG. 3. FIGS. 5 through 8 show shapes of dielectric grains of each region of a body.

Referring to FIGS. 1 through 3, a multilayer capacitor 100 according to an exemplary embodiment in the present disclosure includes a body 110 including a dielectric layer 111 and a plurality of internal electrodes 121 and 122 stacked with the dielectric layer 111 interposed therebetween in a first direction (X direction) and external electrodes 131 and 132, and an average grain size of the dielectric layer 111 is adjusted in each region of the body 110.

The body 110 includes a multilayer structure in which a plurality of dielectric layers 111 are stacked in a first direction (X direction) and may be obtained, for example, by stacking a plurality of green sheets and then sintering the plurality of green sheets. Through the sintering process, the plurality of dielectric layers 111 may have an integrated form. As shown in FIG. 1, the body 110 may have a shape similar to a rectangular parallelepiped. The dielectric layer ill included in the body 110 may include a ceramic material having a high dielectric constant, for example, BT-based, i.e., a barium titanate ($BaTiO_3$)-based ceramic, but other materials known in the art may also be used as long as sufficient capacitance is obtained. The dielectric layer 111 may further include an additive, an organic solvent, a plasticizer, a binder, and a dispersant, if necessary, along with such a ceramic material as a main ingredient. Here, the additive may include a metal component and may be added in the form of a metal oxide during a manufacturing process. An example of such a metal oxide additive may include at least one of $MnO_2$, $Dy_2O_3$, $BaO$, $MgO$, $Al_2O_3$, $SiO_2$, $Cr_2O_3$, and $CaCO_3$.

The plurality of internal electrodes 121 and 122 may be obtained by printing a paste containing a conductive metal to a predetermined thickness on one surface of a ceramic green sheet and then sintering the paste. In this case, as shown in FIG. 2, the plurality of internal electrodes 121 and 122 may include first and second internal electrodes 121 and 122 exposed in the third direction (Z direction) of the body 110 opposing each other. Here, when a direction in which a first surface S1 and a second surface S2 of an active portion 112 of the body 110 face each other is referred to as a second direction (Y direction), the third direction (Z direction) may be a direction perpendicular to the first direction (X direction) and the second direction (Y direction). The first and second internal electrodes 121 and 122 may be connected to different external electrodes 131 and 132 to have opposite polarities when driven, and may be electrically separated from each other by a dielectric layer 111 disposed therebetween. However, the number of the external electrodes 131 and 132 or a method for connecting the external electrodes with the internal electrodes 121 and 122 may vary according to exemplary embodiments. The main ingredient materials of the internal electrodes 121 and 122 may include nickel (Ni), copper (Cu), palladium (Pd), silver (Ag), and the like, and alloys thereof may also be used.

The external electrodes 131 and 132 may be formed outside the body 110 and may include first and second external electrodes 131 and 132 connected to the first and second internal electrodes 121 and 122, respectively. The external electrodes 131 and 132 may be formed by a method of preparing a material containing a conductive metal as a paste and then applying the paste to the body 110. Examples of the conductive metal include nickel (Ni), copper (Cu), palladium (Pd), gold (Au), or alloys thereof. Here, the external electrodes 131 and 132 may further include a plating layer including Ni, Sn, or the like.

Referring to FIG. 3, in the case of this exemplary embodiment, the body 110 may include an active portion 112 in which the plurality of internal electrodes 121 and 122 are located to form capacitance and a side margin portion 113 covering a first surface S1 and a second surface S2 of the active portion 112 facing each other in a second direction (Y direction), and the second direction (Y direction) may be perpendicular to the first direction (X direction). Here, the body 110 may further include a cover part 114 covering the active portion 112 in the first direction (X direction). Here, the cover part 114 may be formed by stacking ceramic green sheets for forming the dielectric layer 112 included in the active portion 112, and if necessary, ceramic green sheets having a composition and a particle size distribution different from those for forming the dielectric layer 111 included in the active portion 112 may also be used.

As described above, the average grain size of the dielectric layer 111 is different in each region of the body 110, which is adjusted based on the results of experiments such as a withstand voltage characteristic, high temperature reliability, and the like which will be described later. When this is described in detail with reference to FIG. 4, FIG. 4 shows a body of FIG. 3 divided by regions, in which internal electrodes are not illustrated. In the present exemplary embodiment, $1<A2/M1\leq1.5$ and $A2<A1$ in which A1 is an average grain size of the dielectric layer 111, A2 is an average grain size of the dielectric layer 111 of the active portion 112 at an active boundary part adjacent to the side margin portion 113, and M1 is an average grain size of the dielectric layer 111 in a central region CM of the side margin portion 113.

Referring to FIGS. 5 to 8 together with FIG. 4, as an example of a method of measuring a grain size, the average grain size of the dielectric layer 111 may be measured based on a cut surface taken in the first direction (X direction) and the second direction (Y direction), and in this case, a surface cut in the middle of the body in the length direction may be used in the third direction (Z direction). When a length of the body 110 in the first direction (X direction) is T and a length of the active portion 112 in the second direction (Y direction) is WA, A1 may be an average size of grains G1 present in a first rectangle R1 which has a horizontal length of WA/3 and a vertical length of T/3 and which is symmetrical, based on a central line L1 in the active portion 112 in the first direction and a central line L2 in the active portion 112 in the second direction. Also, A2 may be an average size of grains G2 present in a second rectangle R2 which has a horizontal length of WA/4 and a vertical length of T/3 and which is symmetrical, based on the central line L2 in the active portion 112 in the second direction. In this case, as illustrated, the second rectangle R2 may be in contact with the side margin portion 113. In addition, when a length of the side margin portion 113 in the second direction (Y direction) is WM, M1 may be an average size of grains G3 present in a third rectangle R3 which has a horizontal length of WM/3 and a vertical length of T/3 and which is symmetrical, based on the central line L3 in the first direction and the central line L2 in the second direction in the side margin portion 113. In the case of measuring the sizes of the grains G1, G2, and G3, a method of measuring the areas of the grains G1, G2, and G3 and converting it into a circle-equivalent diameter may be used. In addition, in order to increase accuracy of measurement, only the grains G1, G2, and G3 whose entire areas are surrounded by grain boundaries may be selected in the reference rectangles R1, R2, and R3. In one example, the average grain size may refer to an arithmetic average grain size of the grains in a respective region. A scanning electron microscope (SEM) may be used to measure a grain, for example. Other methods and/or tool appreciated by one of ordinary skill in the art, even if not described in the present disclosure, may also be used.

The inventors of the present application found that characteristics that may be used as reference of reliability of the multilayer capacitor such as a withstand voltage characteristic were improved when the conditions for the average grain sizes of the dielectric layer 111 described above, i.e., both the condition of $1<A2/M1\leq1.5$ and the condition of $A2<A1$, are satisfied at the same time and confirmed that a relationship between the grain size A2 of the boundary part of the active portion 112 adjacent to the side margin portion 113, rather than a central region of the active portion 112, and the grain size M1 at the central region of the side margin portion 113 is an important parameter. In other words, even the condition of $A2/M1\leq1.5$, together with the satisfied condition of $A1>A2>M1$, also significantly affects reliability of the multilayer capacitor 100, and in case of $A2/M1>1.5$, a grain size deviation between the active portion 112 and the side margin portion 113 may be excessively large to degrade reliability. Details of the average grain size conditions of the dielectric layer 111 described above will be described in detail below.

As a more specific grain size condition, when the condition of $A2/A1\geq0.7$ is satisfied, the reliability improvement effect may be further increased, and in case of $A2/A1<0.7$, a grain size distribution in the active portion 112 is excessively large so as to be disadvantageous in terms of the withstand voltage characteristic. In addition, when the average grain size of the dielectric layer 111 at the side marginal boundary part of the side margin portion 113 adjacent to the active portion 112 is M2, a condition of $M2>M1$ may be additionally satisfied. In addition, a relationship between M1 and M2 may satisfy a condition of $M2/M1\geq0.7$, and in case of $M2/M1<0.7$, a grain size distribution in the side margin portion 113 is excessively large so as to be disadvantageous in terms of the withstand voltage characteristic, etc. Meanwhile, similar to the aforementioned method, M2 may be an average size of grains G4 present in a fourth rectangle R4 which has a horizontal length of WM/4 and a vertical length of T/3 and which is symmetrical, based on the central line L2 in the second direction at the side margin portion 113. In this case, the fourth rectangle R4 may be in contact with the active portion 112.

In order to implement the aforementioned dielectric grain size condition, the following method may be used as an example. That is, in the case of manufacturing a ceramic green sheet by mixing ceramic powder, a binder, and a solvent to form the body 110, a method of adjusting a particle size distribution of ceramic particles, the content of a binder, a Ba/Ti value (i.e., a molar ratio of Ba to Ti), and the like in the active portion 112 and the side margin portion 113 may be used. When the content ratio of the binder is lower or when the Ba/Ti value is higher in a sheet for forming the side margin portion 113 than in a sheet for forming the active portion 112, the sheet for forming the side margin portion 113 first contracts during firing. In this case, a contraction rate of the side margin portion 113 is faster in the central region than in the boundary part, and in contrast, a contraction rate of the active portion 112 may be faster in the boundary part than in the central region. Accordingly, a grain size in the dielectric layer 111 of the side margin portion 113 is relatively small. Since the binder is rarely detected in the active portion 112 and the side margin portion 113 after the firing, the content cannot be compared, but the Ba/Ti value condition may be the same as in the manufacturing process. That is, a molar ratio of Ba to Ti of the dielectric layer 111 at the central region CA of the active portion 112 may be smaller than a molar ratio of Ba to Ti of the dielectric layer 111 at the central region CM of the side margin portion 113. In addition, a molar ratio of Ba to Ti of the dielectric layer 111 at the active boundary part of the active portion 112 adjacent to the side margin portion 113 may be larger than a molar ratio of Ba to Ti of the dielectric layer 111 at the central region CA of the active portion 112 and smaller than a molar ratio of Ba to Ti of the dielectric layer 111 at the central region CM of the side margin portion 113.

Meanwhile, the particle size distribution of ceramic particles may affect the grain size of the dielectric layer 111 in the active portion 112 and the side margin portion 113 after firing, but according to the research of the present inventors, particle size distribution of ceramic particles affected less than the binder content or the Ba/Ti value. Therefore, in order to obtain the aforementioned grain size condition of the present exemplary embodiment, it is not necessary to use ceramic particles having a particle size smaller than those of the sheet for forming the active portion 112 in the sheet for forming the side margin portion 113.

The inventors of the present disclosure produced samples with different average grain sizes in the active portion and the side margin portion to measure the average grain size and the ratio in each region and performed a breakdown voltage (By) and highly accelerated life time (HALT) experiment on each sample. Results of the experiment are shown in Table 1, and the unit of the grain size is nm. In addition, the meaning of the indication items of BV and HALT determination is as follows.

◎: excellent
○: good
Δ: average
X: poor

TABLE 1

| Sample No. | A1 | A2 | M1 | M2 | A2/A1 | M1/M2 | A2/M1 | BV | HALT |
|---|---|---|---|---|---|---|---|---|---|
| 1 | 286 | 223 | 204 | 215 | 0.78 | 0.95 | 1.09 | ◎ | ◎ |
| 2 | 308 | 258 | 220 | 242 | 0.84 | 0.91 | 1.17 | ◎ | ◎ |
| 3 | 274 | 241 | 175 | 223 | 0.88 | 0.78 | 1.38 | ◎ | ◎ |
| 4 | 243 | 232 | 206 | 240 | 0.95 | 0.86 | 1.13 | ◎ | ○ |
| 5 | 372 | 284 | 268 | 231 | 0.76 | 1.16 | 1.06 | ○ | ○ |
| 6 | 357 | 274 | 218 | 245 | 0.77 | 0.89 | 1.26 | ○ | ○ |
| 7* | 309 | 395 | 351 | 357 | 1.28 | 0.98 | 1.13 | ○ | Δ |
| 8* | 252 | 225 | 146 | 152 | 0.89 | 0.96 | 1.54 | ○ | Δ |
| 9* | 321 | 266 | 158 | 198 | 0.83 | 0.80 | 1.68 | Δ | Δ |
| 10* | 349 | 374 | 216 | 235 | 1.07 | 0.92 | 1.73 | Δ | Δ |
| 11* | 434 | 398 | 237 | 252 | 0.92 | 0.94 | 1.68 | Δ | Δ |
| 12* | 317 | 295 | 139 | 220 | 0.93 | 0.63 | 2.12 | Δ | X |
| 13* | 387 | 271 | 147 | 247 | 0.70 | 0.60 | 1.84 | X | X |
| 14* | 229 | 249 | 110 | 215 | 1.09 | 0.51 | 2.26 | X | X |
| 15* | 214 | 272 | 136 | 250 | 1.27 | 0.54 | 2.00 | X | X |

According to the results of the experiment above, Examples (samples 1 to 6) of the present disclosure satisfy both the condition of 1<A2/M1≤1.5 and the condition of A2<A1 and show excellent or good results in the breakdown voltage and HALT experiments. In contrast, Comparative Examples (Samples 7 to 15) did not satisfy either the condition of 1<A2/M1<1.5 or A2<A1 and did not obtain good results. In particular, samples 12 to 15 significantly deviating from the condition of 1<A2/M1≤1.5 were determined as being poor.

Figure 9:
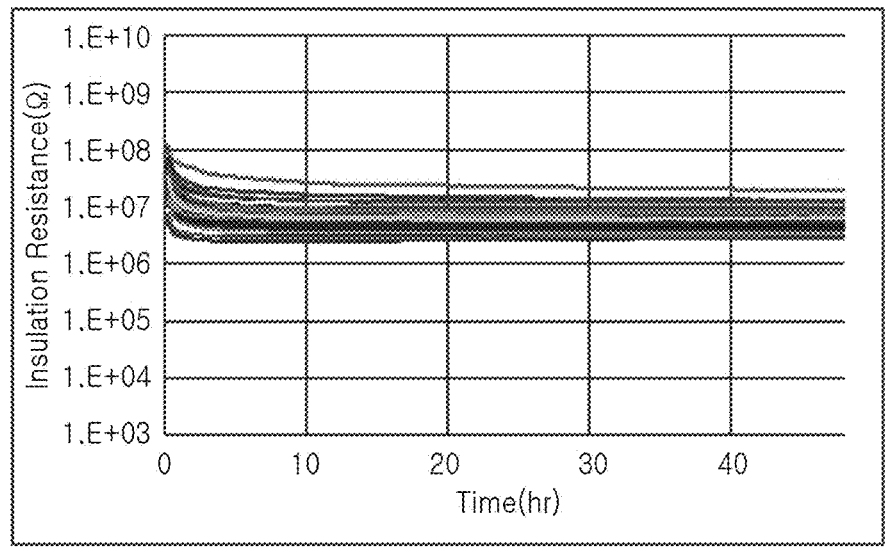
FIGS. 9 through 11 are graphs illustrating results of highly accelerated life time (HALT) experiments of samples prepared according to Examples of the present disclosure and Comparative Examples.
Figure 10:
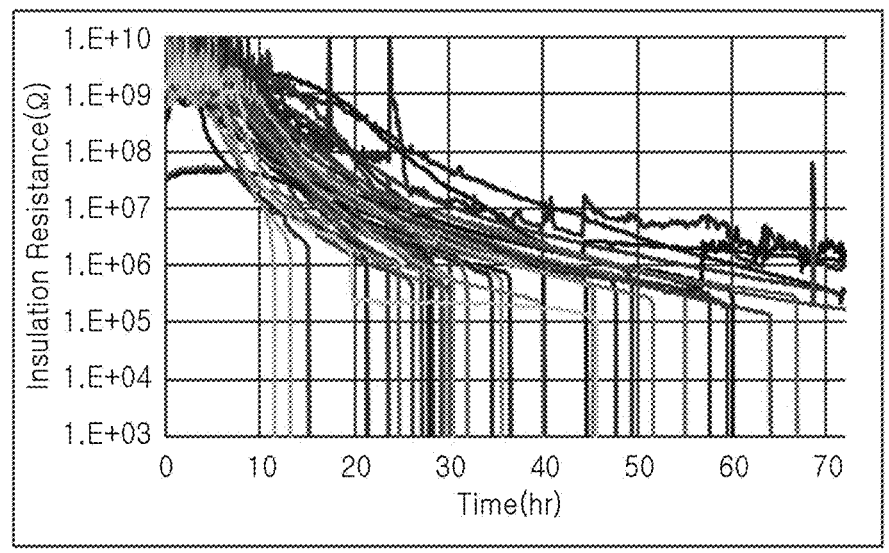
Figure 11:
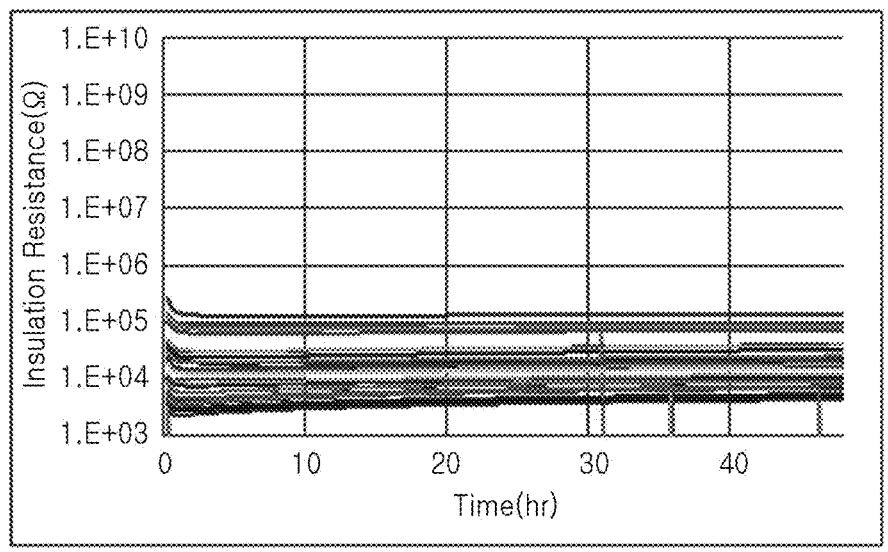

In addition, referring to the results of the HALT experiment in more detail, FIG. 9 shows a graph of a reliability test (measuring an aspect of insulation resistance decreased over time) of samples that satisfy the conditions of 1<A2/M1≤1.5, 0.7≤A2/A1<1, and 0.7≤M1/M2<1. FIG. 10 shows a graph of a reliability test of samples that satisfy the conditions of A2/M1≥1.5, A2/A1≥1, and 0.7≤M1/M2≥1. FIG. 11 shows a graph of a reliability test of samples that satisfy the conditions of A2/M1≤1, A2/A1≤0.7, and M1/M2≤0.7. Referring to the graph of FIG. 9, the samples that satisfy the aforementioned grain size conditions of the present disclosure has excellent HALT. The samples that do not satisfy the aforementioned grain size conditions of the present disclosure have a problem of a reliability as shown in the graph of FIG. 10 or have a problem of a withstand voltage characteristic due to an excessively low insulation resistance as shown in the graph of FIG. 11.

As set forth above, the multilayer capacitor according to exemplary embodiments in the present disclosure has an improved withstand voltage characteristic and high temperature reliability.

While exemplary embodiments have been shown and described above, it will be apparent to those skilled in the art that modifications and variations could be made without departing from the scope of the present disclosure as defined by the appended claims.

What is claimed is:

1. A multilayer capacitor comprising:
a body including a plurality of dielectric layers and a plurality of internal electrodes stacked with the dielectric layer interposed therebetween in a first direction; and
external electrodes formed outside the body and connected to the internal electrodes,
wherein the body includes an active portion in which the plurality of internal electrodes are located to form capacitance and a side margin portion covering a first surface and a second surface of the active portion facing each other in a second direction, and 1<A2/M1≤1.5 and A2<A1 in which A1 is an average grain size of dielectric layers, among the plurality of dielectric layers, in a central region of the active portion, A2 is an average grain size of the dielectric layers at an active boundary part of the active portion adjacent to the side margin portion, and M1 is an average grain size of the dielectric layers in a central region of the side margin portion, and
wherein, T is a length of the body in the first direction and WA is a length of the active portion in the second direction based on a cut surface taken in the first and second directions, A1 is an average size of grains present in a first rectangle which has a length of WA/3 in the second direction and a length of T/3 in the first direction, and the first rectangle is symmetrical, based on a central line of the active portion in the first direction and a central line of the active portion in the second direction.

2. The multilayer capacitor of claim 1, wherein A2/A1 is greater than or equal to 0.7.

3. The multilayer capacitor of claim 1, wherein M2 is greater than M1 in which M2 is an average grain size of the dielectric layers at the side marginal boundary part of the side margin portion adjacent to the active portion.

4. The multilayer capacitor of claim 3, wherein M1/M2 is greater than or equal to 0.7.

5. The multilayer capacitor of claim 1, wherein A2 is an average size of grains present in a second rectangle which has a length of WA/4 in the second direction and a length of T/3 in the first direction, and the second rectangle is symmetrical, based on the central line of the active portion in the second direction.

6. The multilayer capacitor of claim 5, wherein the second rectangle is in contact with the side margin portion.

7. The multilayer capacitor of claim 1, wherein, a length of the side margin portion in the second direction is WM, M1 is an average size of grains present in a third rectangle which has a length of WM/3 in the second direction and a length of T/3 in the first direction, and the third rectangle is symmetrical, based on a central line of the side margin portion in the first direction and a central line of the side margin portion in the second direction.

8. The multilayer capacitor of claim 7, wherein, an average size of the dielectric layers at a side marginal boundary part of the side margin portion adjacent to the active portion is M2, M2 is an average size of grains present in a fourth rectangle which has a length of WM/4 in the second direction and a length of T/3 in the first direction, and the fourth rectangle is symmetrical, based on the central line of the side margin portion in the second direction.

9. The multilayer capacitor of claim 8, wherein the fourth rectangle is in contact with the active portion.

10. The multilayer capacitor of claim 1, wherein the dielectric layers include a barium titanate component, and a molar ratio of Ba to Ti of the dielectric layers in the central region of the active portion is less than a molar ratio of Ba to Ti of the dielectric layers in the central region of the side margin portion.

11. The multilayer capacitor of claim 1, wherein the plurality of internal electrodes include first and second internal electrodes exposed from the body in a third direction crossing the first and second directions, and the external electrodes include first and second external electrodes facing each other in the third direction and connected to the first and second internal electrodes, respectively.

12. The multilayer capacitor of claim 1, wherein the body further includes a cover part covering the active portion in the first direction.

13. A multilayer capacitor comprising:
a body including a plurality of dielectric layers and a plurality of internal electrodes stacked with the dielectric layer interposed therebetween in a first direction; and
external electrodes formed outside the body and connected to the internal electrodes,
wherein the body includes an active portion in which the plurality of internal electrodes are located to form capacitance and a side margin portion covering a first surface and a second surface of the active portion facing each other in a second direction, and $1<A2/M1\leq1.5$ and $A2<A1$ in which A1 is an average grain size of dielectric layers, among the plurality of dielectric layers, in a central region of the active portion, A2 is an average grain size of the dielectric layers at an active boundary part of the active portion adjacent to the side margin portion, and M1 is an average grain size of the dielectric layers in a central region of the side margin portion,
wherein the dielectric layers include a barium titanate component, and a molar ratio of Ba to Ti of the dielectric layers in the central region of the active portion is less than a molar ratio of Ba to Ti of the dielectric layers in the central region of the side margin portion, and
wherein a molar ratio of Ba to Ti of the dielectric layers at the active boundary part of the active portion adjacent to the side margin portion is greater than the molar ratio of Ba to Ti of the dielectric layers at the central region of the active portion and smaller than the molar ratio of Ba to Ti of the dielectric layers at the central region of the side margin portion.

14. A multilayer capacitor comprising:
a body including a plurality of dielectric layers and a plurality of internal electrodes stacked with the dielectric layer interposed therebetween in a first direction; and
external electrodes formed outside the body and connected to the internal electrodes,
wherein the body includes an active portion in which the plurality of internal electrodes are located to form capacitance and a side margin portion covering a first surface and a second surface of the active portion facing each other in a second direction, and $0.7\leq A2/A1<1$ and $0.7\leq M1/M2<1$, in which A1 is an average grain size of dielectric layers, among the plurality of dielectric layers, in a central region of the active portion, A2 is an average grain size of the dielectric layers at an active boundary part of the active portion adjacent to the side margin portion, M1 is an average grain size of the dielectric layers in a central region of the side margin portion, and M2 is an average grain size of the dielectric layers at the side marginal boundary part of the side margin portion adjacent to the active portion, and
wherein, T is a length of the body in the first direction and WA is a length of the active portion in the second direction based on a cut surface taken in the first and second directions, A1 is an average size of grains present in a first rectangle which has a length of WA/3 in the second direction and a length of T/3 in the first direction, and the first rectangle is symmetrical, based on a central line of the active portion in the first direction and a central line of the active portion in the second direction.

15. The multilayer capacitor of claim 14, wherein A2 is an average size of grains present in a second rectangle which has a length of WA/4 in the second direction and a length of T/3 in the first direction, and the second rectangle is symmetrical, based on the central line of the active portion in the second direction.

16. The multilayer capacitor of claim 15, wherein, a length of the side margin portion in the second direction is WM, M1 is an average size of grains present in a third rectangle which has a length of WM/3 in the second direction and a length of T/3 in the first direction, and the third rectangle is symmetrical, based on a central line of the side margin portion in the first direction and a central line of the side margin portion in the second direction.

17. The multilayer capacitor of claim 16, wherein, an average size of the dielectric layers at a side marginal boundary part of the side margin portion adjacent to the active portion is M2, M2 is an average size of grains present in a fourth rectangle which has a length of WM/4 in the second direction and a length of T/3 in the first direction, and the fourth rectangle is symmetrical, based on the central line of the side margin portion in the second direction.

18. The multilayer capacitor of claim 17, wherein the fourth rectangle is in contact with the second rectangle.

19. The multilayer capacitor of claim 14, wherein the dielectric layers include a barium titanate component, a molar ratio of Ba to Ti of the dielectric layers at the active boundary part of the active portion adjacent to the side margin portion is greater than a molar ratio of Ba to Ti of the dielectric layers at the central region of the active portion and smaller than a molar ratio of Ba to Ti of the dielectric layers at the central region of the side margin portion.

20. The multilayer capacitor of claim 14, wherein $A2/M1 \leq 1.5$.

* * * * *